A. TRAVNICEK.
RIDING HARROW ATTACHMENT.
APPLICATION FILED MAY 15, 1908.
929,052.
Patented July 27, 1909.
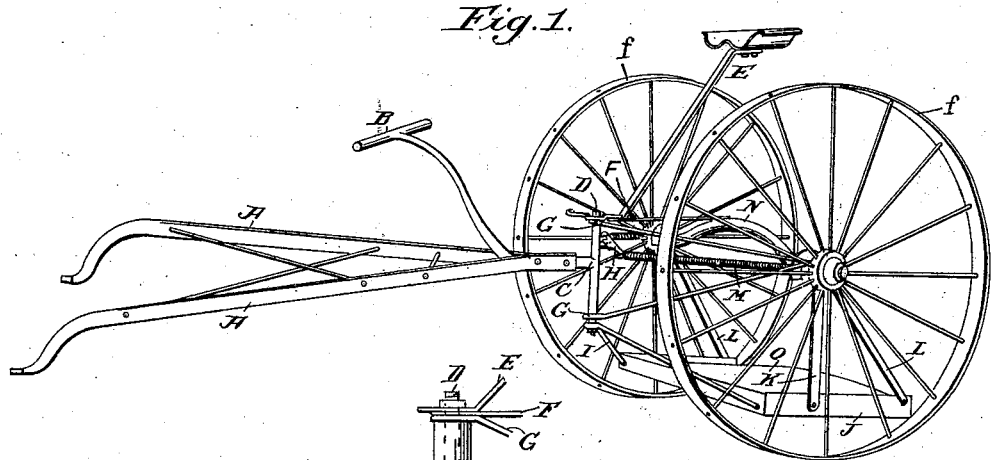
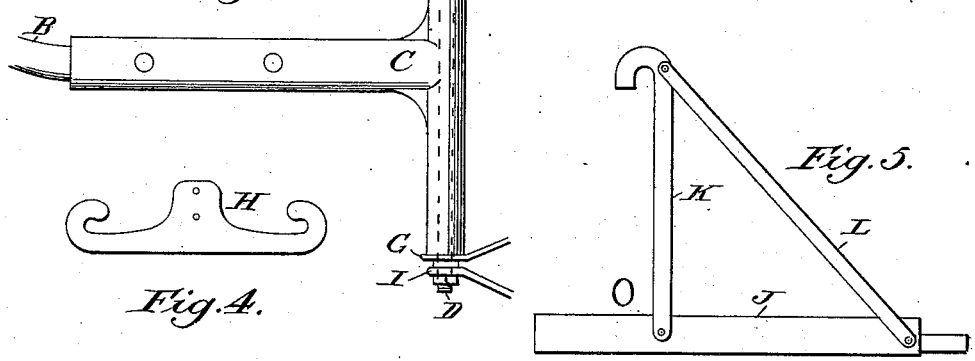
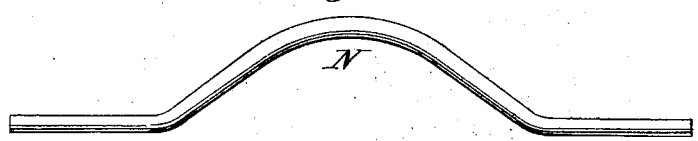
Witnesses:
Inventor:
Albert Travnicek

UNITED STATES PATENT OFFICE.

ALBERT TRAVNICEK, OF MUNICH, NORTH DAKOTA.

RIDING-HARROW ATTACHMENT.

No. 929,052.  Specification of Letters Patent.  Patented July 27, 1909.

Application filed May 15, 1908. Serial No. 433,124.

*To all whom it may concern:*

Be it known that I, ALBERT TRAVNICEK, a citizen of the United States, residing at Munich, in the county of Cavalier and State of North Dakota, have invented certain new and useful Improvements in Riding-Harrow Attachments, of which the following is the specification.

My invention relates to improvements in riding harrow attachments.

The object of my invention is, primarily, to provide an easy geared cart that will keep a man out of the dust when riding on it after a harrow.

Another object is to provide a mechanism that will turn the cart after the harrow as the same is turned, without straining or upsetting the cart, and without necessitating the driver getting off.

Another object is to combine with such a cart, an attachment by means of which stone, stubble and the like may be carried to the end of the field while the device is being used as a riding harrow attachment.

With these and other objects in view, the present invention consists in the combination and arrangement of parts as will be hereinafter more fully described, and particularly pointed out in the appended claims, it being understood that changes in the specific structure shown and described may be made within the scope of the claims without departing from the spirit of the invention.

In the drawings forming a portion of this specification, and in which like letters of reference indicate similar parts in the several views, Figure 1 shows a perspective view of a riding harrow attachment embodying my invention, Fig. 2 shows an enlarged broken detached view of the T-shaped casting as used in my invention, Fig. 3 is a detached detail of the axle, Fig. 4 shows a detached detail in side view of the hook by means of which the springs are attached to the T-shaped casting to regulate the turning of the cart, Fig. 5 is a side view of the tray or platform attachment enabling the cart to be used for carrying purposes.

In the tilling of the soil, it is found in the use of a harrow that it is desirable to provide a conveyance for the operator. Then as the harrow teeth turn up stones, stubble and the like, it is necessary in order to get the best results, that these obstructions be removed. In my invention, I provide a riding harrow attachment for harrows, carrying a tray upon which stones and other objectionable rubbish turned up by the harrow teeth may be carried from the field.

In the accompanying drawings, the letter N represents the crank axle as used in my invention, this axle being arranged to carry the supporting wheels *f* at its ends.

In connection with my attachment, I employ two shafts marked A used for attaching the cart to the harrow when used in the field, and these shafts may also be used in drawing the cart by hand.

The cross head of my T-shaped member is held in a vertical position and at right angles to the sleeve C and forms an integral part thereof. This member is in the form of a tube, giving support to the post D which passes through this member and extends beyond both ends of this cross head forming part of the T-shaped casting.

Extending obliquely and in a downward direction from the upper end of the bolt D, are two frame bars G, which at their ends are clamped over the axle N, adjacent to the wheel hubs as shown. Extending obliquely and in an upward direction from the lower end of the post D, are two frame bars G, which also have their ends secured to the axle N. The bars G of each set are held at an angle to one another in such a manner, that when in use, the cross heads will be held approximately in a vertical position as shown. The cross rod F extends from the upper end of the post D, and is secured to the central upper bowed portion of the axle N.

The driver's seat is held to a bar E, which is also secured to the upper end of the post D, which as shown is in the form of a bolt, having both of its ends threaded and provided with nuts as shown. The tubular head of the member C is arranged to revolve freely about the post D, and near the upper end is provided with a laterally extending ear, to which is bolted a hook ended bracket H, a detailed view of which is shown in Fig. 4. This bracket at each end carries a coil spring M, the ends of these two springs being secured to the axle N, just inside of the wheel hub. These springs being of an equal length and tension, hold the sleeve C at right angles to the axle N. These springs give and take as the guiding attachment trails after the harrow, so that the axle end is in effect held in yielding relation to the harrow insuring an easy guiding of the attachment, and also insuring the cart or seat mechanism properly turning when the harrow is turning. The bar F holds the axle in proper position, and prevents the same from turning.

Each carrying platform or tray used in connection with my harrow attachment, is of wood bound by angle iron, and in Fig. 1 is identified by the reference letter O. This tray is provided with the upstanding hangers K having their upper ends hooked, so that these hangers may be hooked upon the axle N. The tray O is braced to the hangers by means of the stay rod L which has its lower end secured to the tray, two such stay rods being used. In front, the tray or platform is braced by means of the bars I which are held to the post D and at their lower ends are fastened near the ends of the tray as clearly disclosed in Fig. 1. In removing the lower nut upon the post D, the tray or platform may be readily detached from the axle N.

My mechanism is capable of use for several purposes by having different attachments made to it, as for instance in removing the shafts A and securing a push bar B, so also may a barrel be secured to the tray or platform and the axle.

I claim—

1. The combination with a wheel supported axle, of a vertically held post, brace rods extending from the upper end of said post to said axle, brace rods extending from the lower end of said post to said axle, a sleeve revolubly held upon said post, a bracket carried by said sleeve, and springs extending from said bracket to said axle.

2. The combination with a wheel supported axle, of a vertically held post, brace rods extending from the upper end of said post to said axle, brace rods extending from the lower end of said post to said axle, a sleeve revolubly held upon said post, a bracket carried by said sleeve, springs extending from said bracket to said axle, and shafts secured to said sleeve.

3. The combination with a wheel supported axle, of a vertically held centrally positioned post, brace rods extending from the upper end of said post to said axle, brace rods extending from the lower end of said post to said axle, a sleeve revolubly held upon said post, a bracket carried by said sleeve, springs extending from said bracket to said axle, shafts secured to said sleeve, and a cross rod extending from said post and secured to the central portion of said axle.

4. The combination with a wheel supported axle, of a vertically held centrally positioned post, brace rods extending from the upper end of said post to said axle, brace rods extending from the lower end of said post to said axle, a sleeve revolubly held upon said post, a bracket carried by said sleeve, springs extending from said bracket to said axle, a shaft secured to said sleeve, a cross rod extending from said post and secured to the central portion of said axle, and a seat bracket carried by said post.

5. The combination with a wheel supported axle, of a vertically held centrally positioned post, brace rods extending from the upper end of said post to said axle, brace rods extending from the lower end of said post to said axle, a platform, hook ended hangers extending from said platform and hooking over said axle, and brace rods extending from the lower end of said post and secured to said platform.

6. The combination with a wheel supported axle, of brace rods secured to said axle, a post carried by said brace rods, a sleeve carried by said post, a bracket secured to said sleeve and springs extending from said bracket to said axle.

Dated at Munich, N. D. this 7th day of May, 1907.

ALBERT TRAVNICEK.

Witnesses:
 INA S. GRIMSON,
 G. GRIMSON.